United States Patent [19]
Jonner et al.

[11] Patent Number: 5,988,774
[45] Date of Patent: Nov. 23, 1999

[54] HYDRAULIC BRAKE SYSTEM WITH ANTI-LOCK ARRANGEMENT FOR A VEHICLE

[75] Inventors: Wolf-Dieter Jonner, Beilstein-Schmidhausen; Guenter Wolff; Werner Wilde, both of Schwieberdingen; Michael Tischer, Abstatt; Juergen Breitenbacher, Winterbach; Gerhard Wetzel, Korntal-Munchingen; Rainer Heinsohn, Tamm; Andreas Klug, Leonberg; Hermann Kaess, Tamm; Peter Zeiner, Stuttgart; Klaus Schmidt, Moglingen; Harald Ott, Leonberg, all of Germany

[73] Assignee: Robert Bosch GmbH, Stuttgart, Germany

[21] Appl. No.: 08/836,872

[22] PCT Filed: Jul. 18, 1996

[86] PCT No.: PCT/DE96/01351

§ 371 Date: May 21, 1997

§ 102(e) Date: May 21, 1997

[87] PCT Pub. No.: WO97/12791

PCT Pub. Date: Apr. 10, 1997

[30] Foreign Application Priority Data

Sep. 29, 1995 [DE] Germany .......................... 195 36 329
Apr. 24, 1996 [DE] Germany .......................... 196 16 355

[51] Int. Cl.$^6$ ................... B60T 8/62; B60T 8/34
[52] U.S. Cl. ............. 303/189; 303/113.5; 303/900
[58] Field of Search .................. 303/186, 187, 303/189, 113.5, 116.1, 900, 901

[56] References Cited

U.S. PATENT DOCUMENTS

| | | | |
|---|---|---|---|
| 4,640,558 | 2/1987 | Nomura et al. | 303/119 |
| 4,875,741 | 10/1989 | Ozawa et al. | 303/116 |
| 5,040,854 | 8/1991 | Arikawa | 303/119 |
| 5,046,788 | 9/1991 | Lindenman | 303/116 |
| 5,178,442 | 1/1993 | Toda et al. | 303/116.1 |
| 5,219,210 | 6/1993 | Maehara | 303/9.62 |
| 5,375,919 | 12/1994 | Furuhashi | 303/119.1 |
| 5,441,336 | 8/1995 | Takeuchi | 303/116.1 |

FOREIGN PATENT DOCUMENTS

WO 93/25417  12/1993  Germany ................ 303/116

*Primary Examiner*—Robert J. Oberleitner
*Assistant Examiner*—Jeffrey Woller
*Attorney, Agent, or Firm*—Edwin E. Greigg; Ronald E. Greigg

[57] ABSTRACT

A hydraulic brake system for a vehicle with an anti-lock arrangement operable by wheel brake pressures are individually variable in front wheel brakes and rear wheel brakes, connected to diagonal brake circuits, of a four-wheeled vehicle, in order to reduce or eliminate a threat of wheel locking. The anti-lock arrangement has at least one return pump per brake circuit. The anti-lock arrangement is equipped with a total of four electrically controllable valves. In each of the brake circuits I, II there is one first valve between the master cylinder and a front wheel brake and one second valve between the master cylinder and the rear wheel brake. All the valves are embodied as normally open valves and are electrically closable. Inlets of each of the return pumps communicate directly with the respective front wheel brakes and indirectly with the rear wheel brakes through throttles. Check valves that open toward the inlets of the return pumps are provided in series with the throttles. The anti-lock arrangement creates the possibility that in the anti-lock mode, for instance in travel on an icy road, rear wheel brake pressures may be higher than front wheel brake pressures, to improve the braking action.

13 Claims, 10 Drawing Sheets

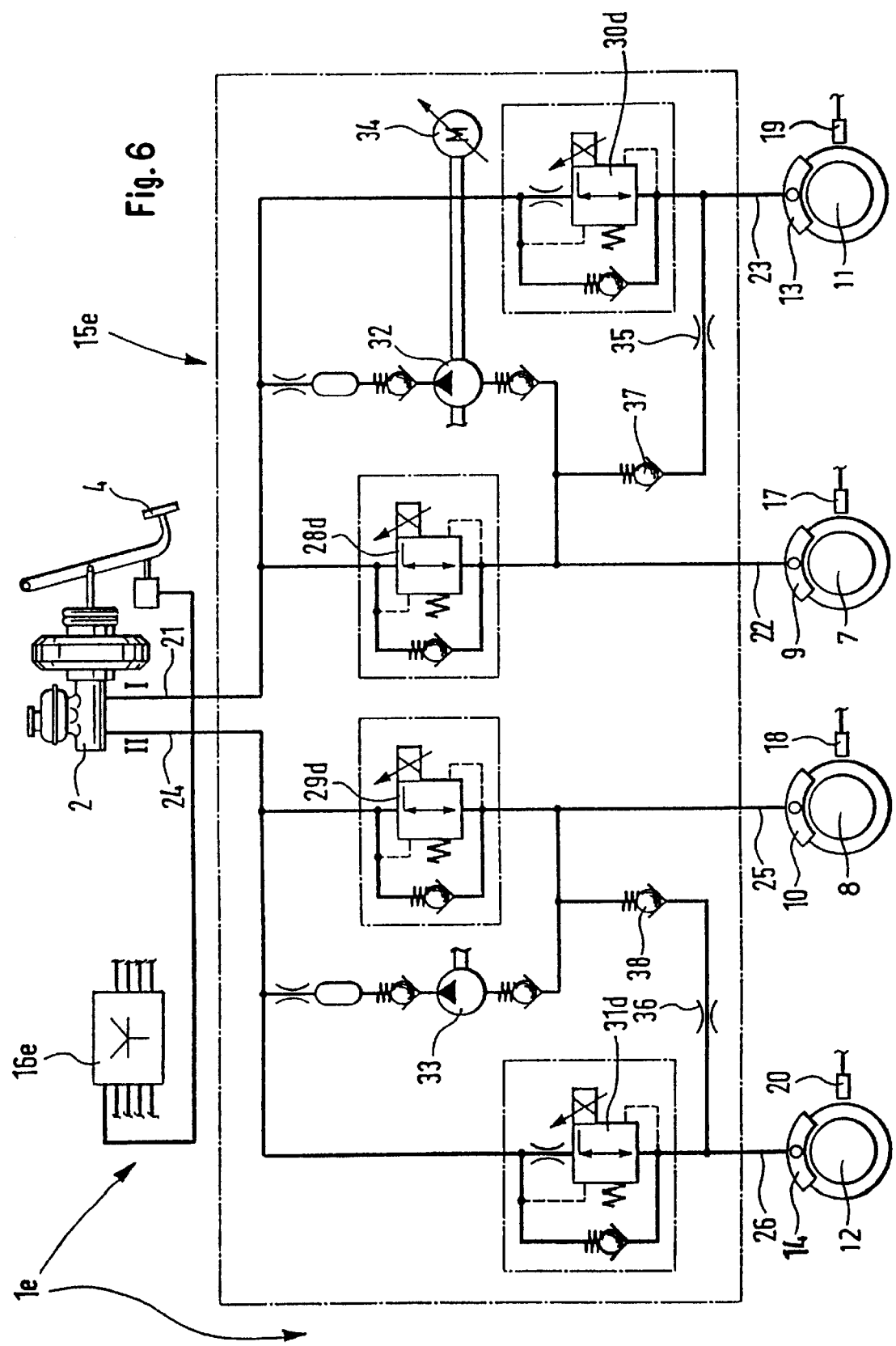

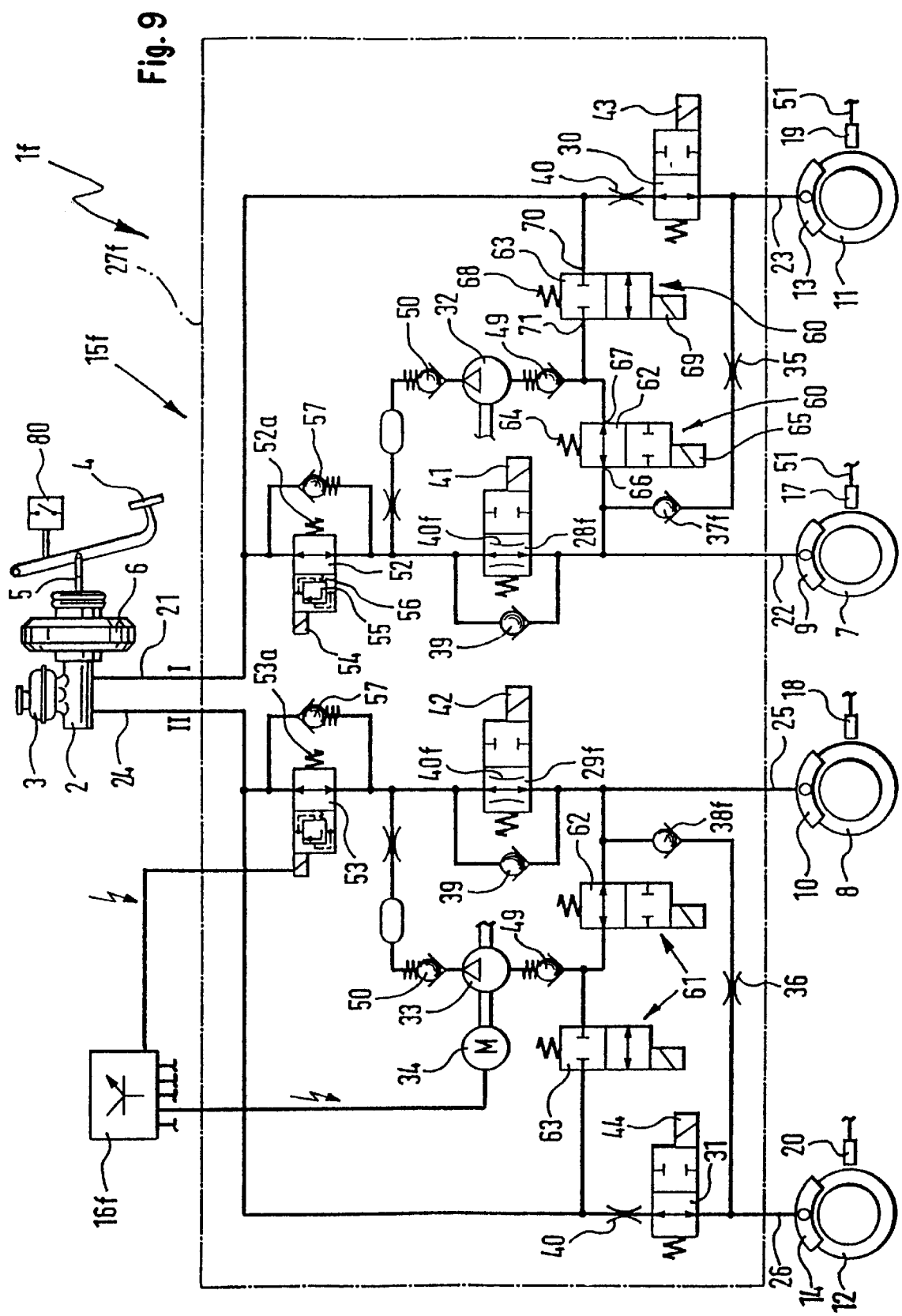

HYDRAULIC BRAKE SYSTEM WITH ANTI-LOCK ARRANGEMENT FOR A VEHICLE

HYDRAULIC BRAKE SYSTEM WITH ANTI-LOCK ARRANGEMENT

Prior Art

The invention relates to a hydraulic brake system with an anti-lock arrangement for a vechicle.

Published German Patent Application DE 4 422 518 A1 discloses a hydraulic brake system defining this generic type, having a dual-circuit master cylinder, with two brake circuits in a diagonal configuration for two front wheel brakes and two rear wheel brakes, and with an anti-lock arrangement incorporated into the brake circuits; per brake circuit, the anti-lock arrangement has one return pump with an inlet and an outlet and one first and one second electrically controllable valve; these valves are embodied as normally open valves, the first valve being disposed between the master cylinder and the respective front-wheel brake and each second valve being connected to the associated rear wheel brake. The respective second valve normally connects the rear wheel brake of one brake circuit to the front wheel brake of the same brake circuit. In the anti-lock mode, this had the disadvantage that a brake pressure in the rear wheel brake cannot rise any higher than a brake pressure in the front wheel brake. If one wanted to raise the brake pressure in the rear wheel brake above an allowable front wheel brake pressure, then one would have to briefly overbrake the front wheel with the consequence of possibly excessive brake slip, loss of steerability, and excessive tire wear. The demand for a higher brake pressure in the rear wheel brake compared with the brake pressure of a front wheel brake is dictated for instance by the fact that when the gas pedal is released, a drive motor of the vehicle associated with the front wheels acts to brake the front wheels, which especially on snow and ice once the brake pedal is actuated can rapidly lead to the danger of front wheel locking. Another reason for the demand for a relatively higher brake pressure in a rear wheel brake than in a front wheel brake is that on a road surface with poor traction and accordingly less capability of slowing down the vehicle, the rear wheels can make a relatively greater contribution to vehicle deceleration than is possible on a road surface with good traction.

Advantages of the Invention

The hydraulic vehicle brake system according to the invention has the advantage that in the anti-lock mode, at least on a road surface with poor traction, a rear wheel brake pressure can at least intermittently be higher than a front wheel brake pressure.

Advantageous further features of and improvements to the hydraulic brake system disclosed herein are possible with the provisions recited hereinafter.

The system has the advantage that conditionally in the anti-lock mode, the brake pressure of the front wheel brake can be intermittently set higher than the instantaneous rear wheel brake pressure. Additionally there is the possibility during normal braking, on reaching a slip limit associated with the rear wheels, to discontinue brake pressure increases in the rear wheel brakes by closing the second valves and thereby to assure that in braking on a road surface with very good traction, the front wheels will tend to lock before the rear wheels. As a result, it is possible to avoid installing rear wheel brake pressure regulating valves or rear wheel brake pressure limiting valves that operate as a function of deceleration or rear axle load.

The vehicle brake system has an advantage that economical values can be used, and it is possible to use 2/2-way valves from the prior art.

The vehicle brake system has the advantage that economical 2/2-way valves of conventional design and size can be used, and that a flow resistance necessary in at least one of the wheel brakes in order to determine brake pressure buildup speeds is realized by means of a throttle.

The vehicle brake system has the advantage that brake pressure change rates are adjustable by means of an electromagnet in the valve located between the master cylinder and the respective wheel brake and can optionally be varied during the anti-lock mode. To that end, the exciting current of the electromagnet is adjusted or regulated.

The hydraulic brake system having the characteristics set forth herein has the advantage that during the raising of the brake pressure in a front wheel brake, the full capacity of the return pump is available for rapid rear wheel brake pressure lowering inside the rear wheel brake associated with the same brake circuit.

The hydraulic brake system has the advantage that by means of only a single electromagnet per wheel brake, for instance per front wheel brake, brake pressure variation rates are adjustable by variable excitation of the electromagnet. For example, by adjusting the exciter current, a magnitude of a pressure difference between the affected wheel brake and the master cylinder can be adjusted, even if the pumping capacity of the return pump should vary, as a consequence of varying pressure differences between the master cylinder and at least one of the wheel brakes or as a consequence of different supply voltages of an electric drive motor of the return pumps.

The hydraulic brake system makes it possible, especially when progressive valves or differential pressure valves are used, after a first major lowering of brake pressure by means of a high pumping capacity of the return pump to set the pumping capacity of these return pumps lower whenever as the anti-lock mode continues only slight brake pressure changes are then necessary. This has the advantage of using less energy and producing less noise. This capability is useful if a heavily braked vehicle traveling on a part of a road with good traction gets onto an icy patch of road.

The hydraulic brake system has the advantage that in an economical way, one bypass per brake circuit, equipped with a check valve, suffices to lower the brake pressure rapidly in the front wheel brake and the rear wheel brake when the brake pedal is released.

A further feature has the advantage that while the return pumps, which serve to protect against wheel locking during braking by actuation of the brake pedal, continue to be used, traction control is additionally possible by automatic braking, by means of compensation for excessive drive torque at drivable front wheels.

The various structural embodiment characteristics are not the only ones that are possible in conjunction with anti-lock arrangements of the so-called return-feed type with a further embodiment for the traction control mode. The characteristics define a concrete exemplary embodiment that can be learned from International Patent Application WO 94/08831. Finally, the characteristics have the effect that whenever the second valves are closed, the rear wheel brake pressure can be lowered to the front wheel brake pressure when brake pressure is lowered by release of the brake pedal, for instance.

BRIEF DESCRIPTION OF THE DRAWINGS

Eight exemplary embodiments of the vehicle brake system of the invention are shown in the drawing and described in further detail below.

FIG. 6 shows a further circuit diagram of the vehicle brake system with first and second valves in the form of differential pressure valve;

FIG. 9 shows a first further embodiment of the vehicle brake system of FIG. 1 for regulating drive slip, i.e. traction control, at drivable front wheels.

DESCRIPTION OF THE EXEMPLARY EMBODIMENTS

Figure 1:
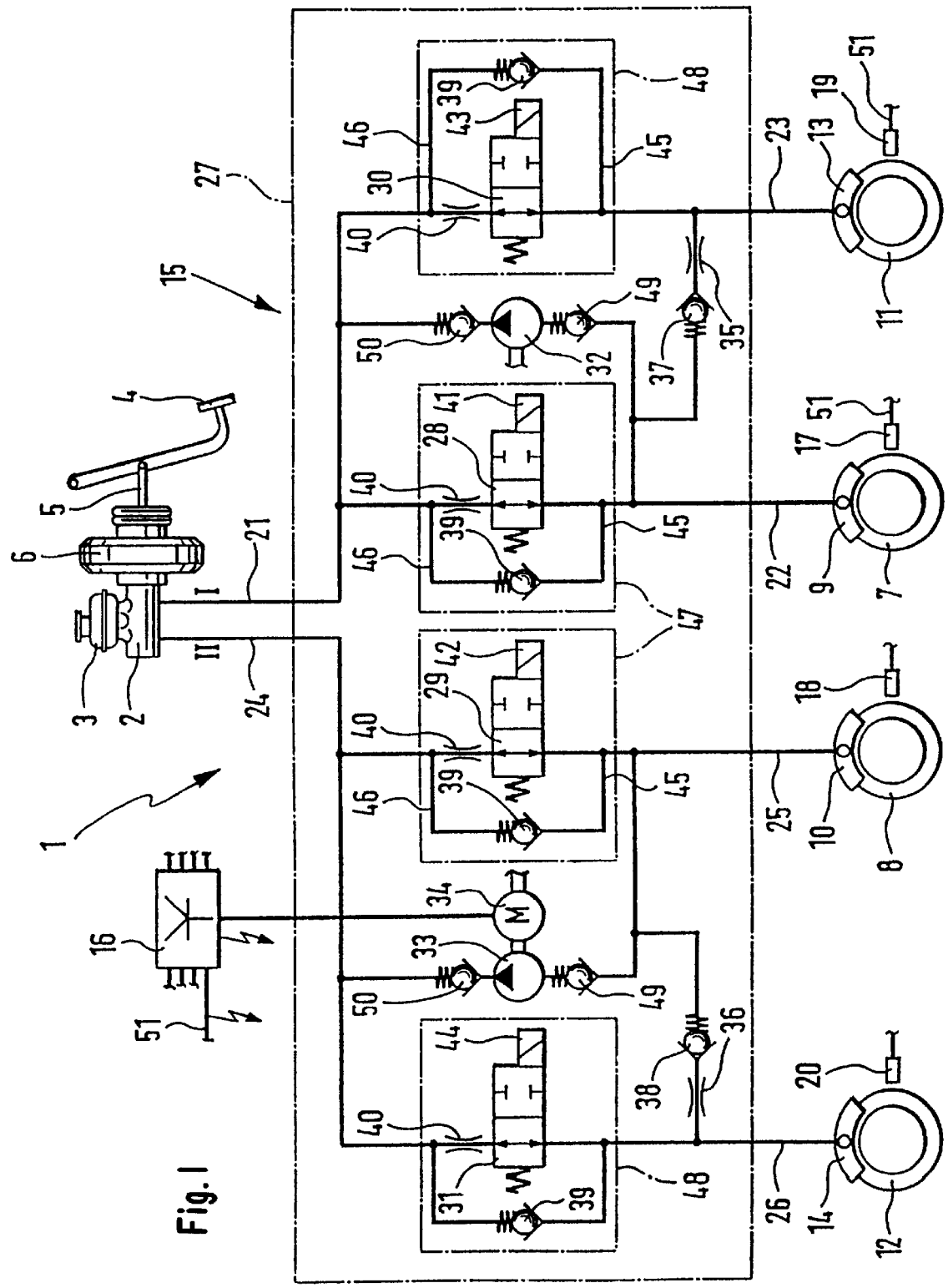
FIG. 1 shows a first circuit diagram of the vehicle brake system with first and second valves in the form of 2/2-way valves.

The hydraulic vehicle brake system 1 of the circuit diagram of FIG. 1 has a dual-circuit master cylinder 2 with a fluid container 3, a brake pedal 4, a pedal rod 5, a brake booster 6, two brake circuits I and II, two front wheel brakes 7, 8 with wheel brake cylinders 9, 10, two rear wheel brakes 11, 12 with wheel brake cylinders 13, 14, an anti-lock arrangement 15, and as part of the anti-lock arrangement a control unit 16 as well as wheel rotation sensors 17, 18, 19 and 20.

Brake circuit I includes a master brake line 21, originating at the master cylinder 2 and leading to the anti-lock arrangement 15, and wheel brake lines 22 and 23, which originate at the anti-lock arrangement 15 and end at the wheel brake cylinders 9 and 13. In the same way, brake circuit II includes a master brake line 24 and two wheel brake lines 25 and 26; the wheel brake line 25 leads to the wheel brake cylinder 10, and the wheel brake line 26 leads to the wheel brake cylinder 14.

The anti-lock arrangement 15 has a valve receiving block 27, into which are built first valves 28 and 29 and second valves 30 and 31, two return pumps 32, 33 having a common drive motor 34, two throttles 35, 36 and in series with them two check valves 37 and 38. Selectively, still further check valves 39 and further throttles 40 may also be built in.

The first valves 28 and 29 are embodied as 2/2-way valves controllable by means of electromagnets 41 and 42 and are open when the electromagnets 41 and 42 are without current. The second valves 30 and 31 are controllable by means of further electromagnets 43 and 44 and are likewise embodied as 2/2-way valves, which are open when the electromagnets 43 and 44, respectively, are without current. The first valves 28, 29 are built into the two brake circuits I and II between the respective master brake lines 21 and 24 that originate at the master cylinder 2 and the wheel brake lines 22 and 25 leading to the wheel brake cylinders 9 and 10, respectively. The check valves 39, in conjunction with bypass lines 45 and 46, form bypasses around the first valves 28 and 29; the check valves 39 can be opened to the master brake lines 21 and 24 and thus to the master cylinder 2. The check valves 39 may for instance be embodied in the form of known cuff-type check valves and can be combined with the valve 28 and 29 to form structural units 47, as represented symbolically by dot-dashed outlines in the drawing. For example, known springless ball check valves or the like may also be built in. The further throttles 40 are connected in series with the first valves 28 and 29 and are likewise included in the structural unit 47.

The second valves 30 and 31 are installed between the respective master brake lines 21 and 24 and the master brake lines 23 and 26 and are accordingly installed between the master cylinder 2 and the wheel brake cylinders 13 and 14, respectively. The check valves 39 with bypass lines 45 and 46 are again disposed selectively as bypasses that circumvent the second valves 30 and 31, respectively, and can be opened toward the master cylinder 2. Once again, one throttle 40 is connected in series with each of the second valves 30 and 31. Once again, the second valves 30, 31 and the further check valves 39 and the further throttles 40 can be combined into structural units 48.

The return pumps 32, 33 have inlets 49 in the form of inlet check valves and outlets 50 in the form of outlet check valves. The outlet check valves 50 communicate with the respective master brake lines 21 and 24. The inlet check valves 49 hydraulically communicate permanently with the respective wheel brake lines 22 and 25 and thus with the wheel brake cylinders 9 and 10. As already noted, the wheel brakes 7 and 8 are associated with the wheel brake cylinders 9 and 10 and belong to the brake circuits I and II. Accordingly, the brake circuits I and II are in a diagonal configuration.

Unlike the wheel brake cylinders 9 and 10 of the front wheel brakes 7 and 8, respectively, the wheel brake cylinders 13 and 14 of the rear wheel brakes 11 and 12 communicate with the inlet check valves 49 of the respective return pumps 32 and 33 via the interposition of the throttles 35 and 36 and the check valves 37 and 38 connected in series with them. As a result, the bypasses around the second valve 30, 31 are omitted and the rear wheel brake cylinders 13, 14 can be rapidly relieved of brake pressures inexpensively at the end of braking by release of the brake pedal 4 by means of the bypasses of the first valves 28, 29. If the check valves 37, 38 are omitted, then the two bypasses could be located so as to bypass the two second valves 30, 31.

The wheel rotation sensors 17–20 are embodied in a known manner by way of example, such that per revolution of a wheel associated with them they output a number of pulses that are carried to the control unit 16 through lines 51, shown only incompletely in the drawing. The control unit 16 is arranged in a manner known per se such that from time intervals between pulses arriving from the wheel rotation sensors 17, 18, 19 and 20 it can tell whether the threat of wheel locking, or in other words an excessive or disadvantageously major slip, exists. Depending on the recognition of the danger of wheel locking in at least one of the wheels, not shown, the control unit 16 causes the drive motor 34 to be turned on and thus causes the return pump 32 and 33 to be put into operation. The control unit 16 also moves whichever valve, among the first valves 28, 29 or second valves 30, 31, is associated with a wheel that is threatening to lock into the closing position.

For instance if there is a threat of wheel locking at one front wheel, which is associated with the wheel brake 7 and accordingly the wheel brake cylinder 9, then the first valve 28 is closed, with the consequence that the return pump 32 that is in operation returns pressure fluid back to the master cylinder 2 from the wheel brake cylinder 9. Consequently the brake pressure decreases inside the wheel brake cylinder 9 and the braking action lessens, so that the threat of locking is reduced. Once the threat of wheel locking is adequately reduced, the first valve 28, for instance, is opened and resumes its outset position, with the consequence that a pressure difference, present as a consequence of the preceding lowering of brake pressure, between the master cylinder 2 and the wheel brake cylinder 9 becomes less through the throttle 40. The throttle 40 serves to reduce such a pressure difference more slowly, so that on the one hand noise created by the opening of the first valve 28 is as slight as possible and on the other changes in braking force do not occur abruptly, which might lead to overbraking of the effected wheel again. A second possibility is to choose a larger cross section for the throttle 40 that for the mode of operation described and instead during an increase of brake pressure in the wheel brake cylinder 9 to open and close the first valve 28 periodically, in the manner described in U.S. Pat. No. 3,637,264, so that a brake pressure increase is effected in stages.

If the threat of wheel locking occurs at a rear wheel, for instance, associated with the rear wheel brake 11, then the second valve 30 is closed. Consequently the return pump 32 that is actuated will return pressure fluid from the wheel brake cylinder 13, which along the way to the inlet check valve 49 flows through the throttle 35 and the check valve 37, back to the master cylinder 2 via the outlet check valve 50 and the master brake line 21. As a consequence, the brake pressure in the wheel brake cylinder 13 drops, so that a threat of wheel locking occurring at the rear wheel is reduced or eliminated. Once the threat of wheel locking is eliminated, then it is possible, for instance in the manner described for the first valve 28, to control the second valve 30 into its open position as well. It will be appreciated that within brake circuit I the front wheel brake 7 and the rear wheel brake 11 each have their own valve 28 and 30, respectively, so that the delivery of brake fluid from the master cylinder 2 to the wheel brake cylinders 9 or 13 can be controlled individually as a function of the threat of wheel locking.

Accordingly, since the rear wheel brake 11 is assigned its own valve 30 for interrupting the inflow of pressure fluid, and since the wheel rotation sensor 19 is associated with the rear wheel and the control unit 16 is capable of detecting increasing wheel slip and an incipient threat of wheel locking or in other words the occurrence of brake slip and its magnitude, then in addition to its use in the anti-lock mode, the second valve 30 is also used in normal braking operation, if the brake pedal 4 is actuated increasingly strongly, to close the second valve 30 already as soon as a preselected brake slip magnitude threshold stored in memory in the control unit 16 is reached. This offers the possibility, while embodying the rear wheel brakes as intrinsically highly effective, of nevertheless having the front wheels lock before the rear wheels, up to a legally prescribed deceleration, on a road surface with very good traction, so that a vehicle equipped in this way remains controllable. From the time the second valve 30, and logically the second valve 31 in the other brake circuit II, closes, it is accordingly possible, since the first valve 28 and 29 are opened, for the driver to intentionally increase brake pressures in the wheel brake cylinders 9 and 10 of the front wheel brakes 7 and 8. For example, and this can vary depending on vehicle type and load, a brake pressure rise in the wheel brake cylinders 13 and 14 can be limited to approximately 25 bar by means of the second valves 30, 31, at the slip magnitude threshold specified for the control unit 16.

Modes of Operation of the Anti-Lock Arrangement

Figure 7A:
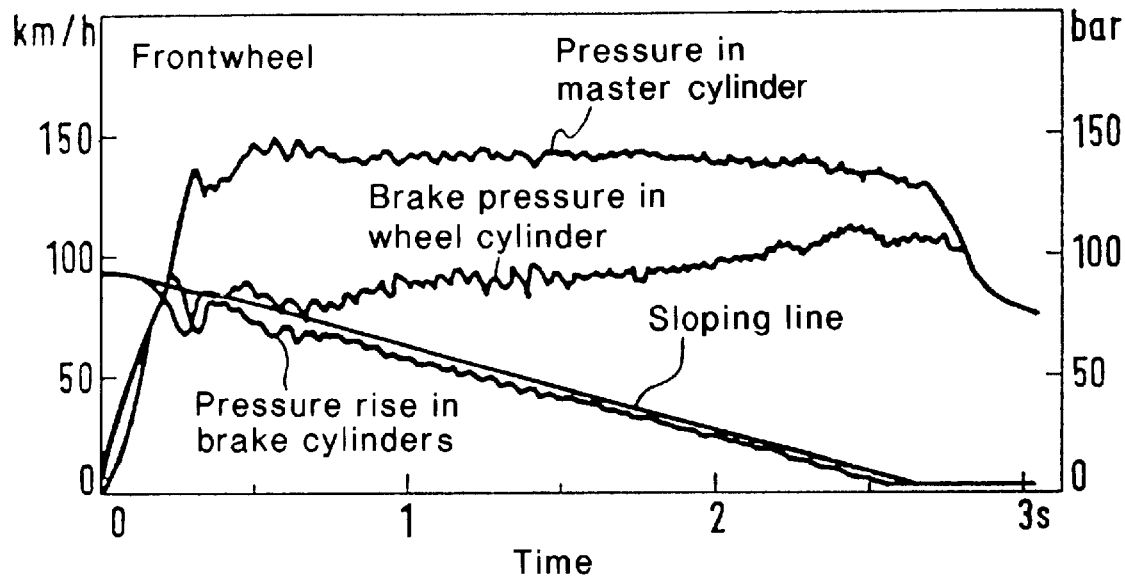
FIG. 7 is a graph of a measurement plotting in an anti-lock event over dry asphalt.
Figure 7B:
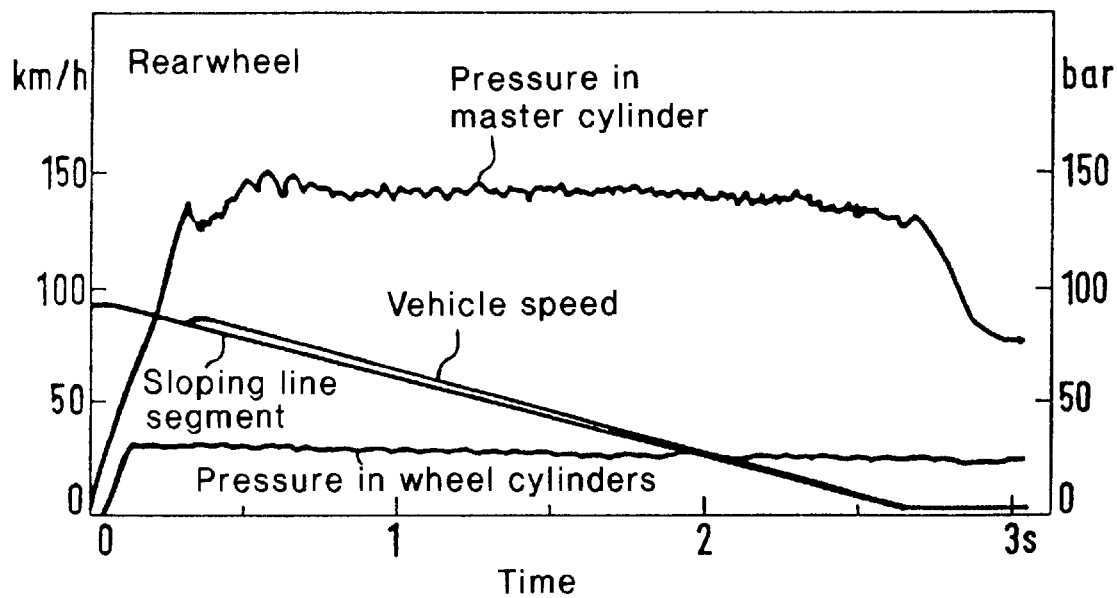

From the graph of a measurement plotting shown in FIG. 7, which is valid for both brake circuits I and II, the mode of operation will be described for a braking event on dry asphalt. In FIG. 7, both in the lower half and the upper half, beginning at time zero, a rise in the pressure PHZ can be seen; PHZ is the pressure in the master cylinder 2, caused by actuation of the brake pedal 4. For example through the throttles 40 preceding the second valves 30 and 31, a briefly delayed brake pressure rise PRADH occurs for rear wheels in the wheel brake cylinders 13 and 14; in accordance with the above-described embodiment of the control unit 16 this rise is limited to the aforementioned value of approximately 25 bar. Accordingly, a line associated with PRADH in FIG. 7 extends essentially parallel to the time reference line. In the upper half of FIG. 7, a pressure rise PRADV takes place in the wheel brake cylinders 9 and 10 of the front wheels, initially only slightly delayed relative to the pressure PHZ in the master cylinder.

The brake pressures in the wheel brake cylinders 13 and 14 and in the wheel brake cylinders 9 and 10 result in vehicle deceleration, which is represented in both the lower and upper halves of FIG. 7 by sloping straight lines indicating the drop in a vehicle speed VFZG. Beginning at a vehicle speed of approximately 90 km/h, this vehicle speed will lead to a full stop of the vehicle after approximately 2.7 seconds.

Returning now to the upper half of FIG. 7 and the brake pressure course PRAV, beginning at the pressure of 0 bar. As already noted, the pressure PRADV in the wheel brake cylinders 9 and 10 initially rises in somewhat delayed fashion and hence more steeply than the pressure PHZ in the master cylinder 2, as indicated by a further line VRADV extending in garland-like fashion below the sloping line VFZG, an interval which initially increases in size forms between the two lines VFZG and VRAV. This interval indicates the slip of the front wheel relative to the roadway. Where the interval is becoming larger, the slip of the front wheel is growing. As already noted, the control unit 16 detects that the danger of wheel locking has arisen for the front wheel or both front wheels, and it turns on the drive motor 34 of the return pumps and closes the first valves 28 and 29. As a consequence, the brake pressure in the wheel brake cylinders 9 and 10 drops, as can be seen from the line PRADV, with the consequence of a reduction in braking forces and a reduction of front wheel slip, and as a result the line VRADV comes closer to the line VFZG above it. Since in principle the first valves 28 and 29 are two-position valves, and the elimination of one threat of wheel locking by temporary lowering of brake pressure can be followed by a new threat of wheel locking, if the brake pressure is repeatedly raised and lowered, the result is the undulating course PRADV in the wheel brake cylinders 9 and 10 of the front wheel brakes 7 and 8. Hence since increases and decreases in brake pressure alternate, the brake slip will naturally also vary, which can be seen from the likewise undulating line VRADV in the upper half of FIG. 7.

Since quantities of pressure fluid are drawn in alternation from the front wheel brake cylinders 9 and 10 and are returned to the master cylinder 2 by means of the return pump 32 or 33, and from the master cylinder the pressure fluid quantities can be returned to the wheel brake cylinders 9, 10 again by opening of the first valves 28 and 29, pressure fluctuations naturally occur in the master cylinder as well, which can be seen from the undulating line PHZ.

As can be learned from the lower half of FIG. 7 from the course of the line PRADH, an anti-lock event was unnecessary for the rear wheels of the vehicle.

Figure 8A:
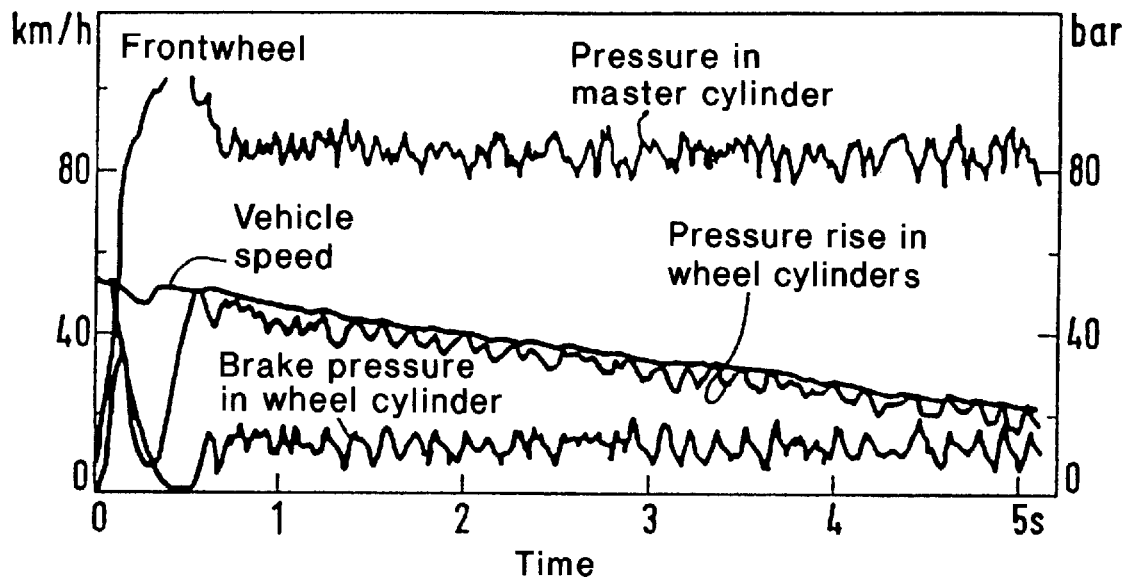
FIG. 8, is a graph of a measurement plotting in an anti-lock event over an icy road.
Figure 8B:
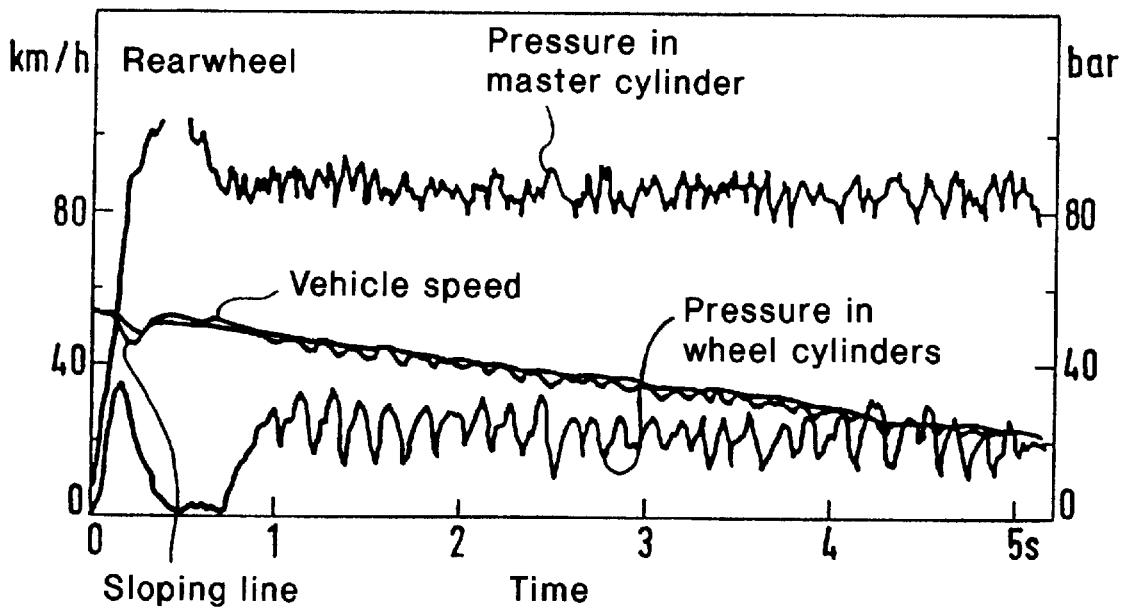

Anti-lock operation over an icy road can be learned from the graph of the measurement plotting in FIG. 8. Unlike FIG. 7, in FIG. 8 a lower starting speed and a different scaling of pressures is shown. If one assumes that a driver actuates the brake pedal 4 immediately, then the pressure PHZ, that is, the pressure in the master cylinder 2, rises immediately. The pressures PRADH in the two wheel brake cylinders 13, 14 rise steeply as well, with some delay, so that in the wheel brake cylinders 13 and 14, the pressure PRADH rises so high, before the second valves 30 and 31 close, that the rear wheels begin to lock. This can be seen from the steeply downward-pointing line segment VRADH compared with the vehicle speed VFZG. The closure of the second valves 30 and 31 with the simultaneous actuation of the return pumps 32 and 33 produces a sharp, pronounced brake pressure drop in the wheel brake cylinders 13 and 14, corresponding to the course of the curve PRADH associated with the rear wheel. At the same time, a very pronounced threat of wheel locking arises for the front wheels as well, which can be seen from the upper half of FIG. 8 from an even more-pronounced major drop in the circumferential wheel speed VFZG. Approximately 0.25 seconds after the onset of braking, the lowest circumferential speed of the front wheels is reached by closure of the first valves 28 and 29, with the return pumps 32 and 33 running and with the resultant major drop in brake pressure. After that, the circumferential speed of the front wheels VRADV approaches the vehicle speed VFZG; as a result, as can be seen, the brake slip vanishes for a moment and thus the danger of wheel locking is eliminated. The elimination of this threat of wheel locking allows a brake pressure rise in the wheel brake cylinders 9 and 10 of the front wheel brakes 7 and 8, which can be seen in the upper half of FIG. 8. The first rise in brake pressure after the deep drop does admittedly trigger a new threat of wheel locking, which can be seen from the sloping part of the line VRADV immediately after the brake slip has vanished. After that, by repeated closure and opening of the first valves 30 and 31, the brake pressure in the wheel brake cylinders 9 and 10 of the front wheel brakes 7 and 8, respectively, fluctuates around a mean value that is on the order of magnitude of 10 bar. By comparison, in the wheel brake cylinders 13 and 14 of the rear wheel brakes 11 and 12, respectively, the brake pressure fluctuates about a mean value of approximately 20 bar. It can thus be seen that the mean rear wheel brake pressure is markedly higher than the mean front wheel brake pressure during an anti-lock operation over an icy road, while conversely in brake operation without the threat of wheel locking, the rear wheel brake pressure is no higher than the front wheel brake pressure. It can thus be appreciated that the demand referred to in the background section of being able to set the rear wheel brake pressure higher than the front wheel brake pressure so that rear wheel brakes can optionally furnish an increased contribution to decelerating the vehicle, is met.

An overelevation of the pressure PHZ in the master cylinder 2, expressed as a bump in the curve, from the time the threat of wheel locking appears at either the front wheels or the rear wheels can be explained by the fact that the driver has actuated the brake pedal 4 at a certain rate and as a result of the closure of the first valves and second valves 28, 29, 30 and 31 has suddenly met with increased resistance, which leads to the temporary overelevation of pressure in the master cylinder. The overelevation of pressure is reinforced by the fact that the return pump 32 and 33 pump pressure fluid back into the master cylinder 2 from the wheel brake cylinders 9, 10, 13 and 14 to a considerable extent.

Figure 2:
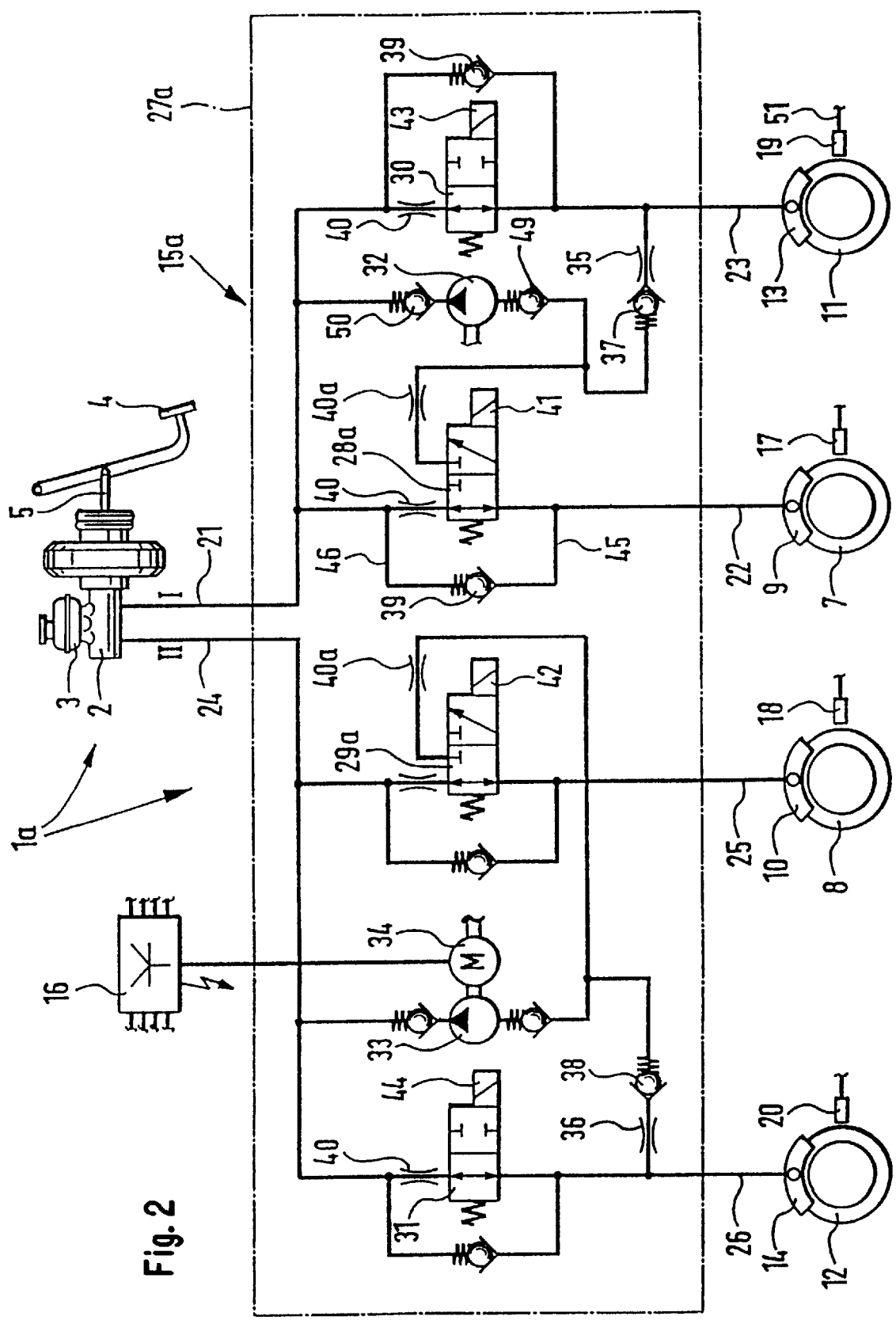
FIG. 2 shows a second circuit diagram of the vehicle brake system with first valves in the form of 3/2-way valves.

The vehicle brake system 1a according to the invention shown in FIG. 2 differs from the vehicle brake system 1 of FIG. 1 in that first valves 28a and 29a, which are each disposed between the respective master brake lines 21, 24 and wheel brake lines 22 and, 25 are embodied as 3/2-way valves that can be controlled by means of electromagnets 41 and 42, respectively. These second valves 28a and 29a are embodied such that when the electromagnets 41 and 42 are currentless they furnish open communications between the master brake lines 21 and 24 and the wheel brake lines 22 and 25, respectively. If the electromagnets 41 and 42 are supplied with exciter current, then the valves 28a and 29a disconnect the wheel brake cylinders 9 and 10 from the master cylinder 2 and connect the wheel brake cylinders 9 and 10 to the respective inlet check valve 49 of the respective return pump 32 or 33. By incorporating further throttles 40a between the 3/2-way valves 28a and 29a and the respective return pump 32 or 33, it is possible to vary the rates of brake pressure reduction in the wheel brake cylinders 9 and 10. If the 3/2-way valves 28a and 29a are in the basic positions shown and if there is a threat of wheel locking at the rear wheels, then brake pressures in the wheel brake cylinders 13 and 14 are lowered by closure of the second valves 30 and 31, respectively, without reducing the brake pressures in the wheel brake cylinders 9 and 10 of the front wheel brakes 7 and 8, respectively.

As in the exemplary embodiment of FIG. 1, it is possible, although this is not shown in FIG. 2, to combine the first valves and second valves, with the respective check valves 39 and throttles 40, into structural units and to insert them into a valve receiving block 27a. Because the first valves 28a and 29a are now embodied as 3/2-way valves, and because of the requisite altered conduit course 40 for the purpose, the valve rising block 27a differs from the valve receiving block 27 of FIG. 1.

Figure 3:
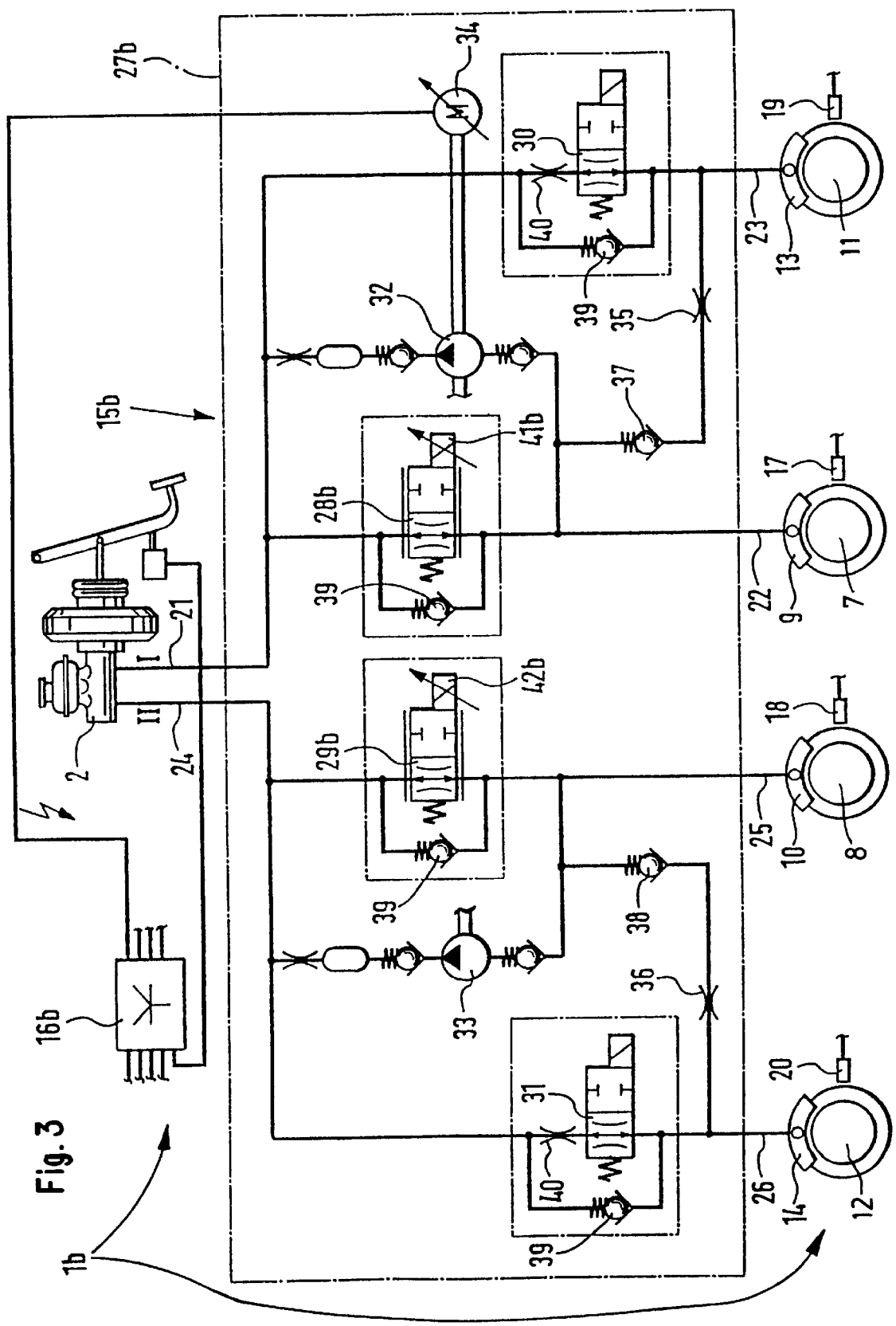
FIG. 3 shows a further circuit diagram of the vehicle brake system with first valves in the form of progressive multiposition valves.

The vehicle brake system 1b according to the invention shown in FIG. 3 differs from the vehicle brake system 1 of FIG. 1 in that the first valves 28b and 29b are embodied as progressive valves, which is symbolized under the ISO standard by parallel lines next to the squares of the valve symbol and by arrows for variability at associated electromagnets 41b and 42b. The first valves 28b and 29b can therefore be used as throttling multiposition valves, with the advantage that by progressive closure by means of increasing current intensity that acts upon the electromagnets 41b and 42b, the first valve 28b and 29b first act in throttling fashion and then in a closing manner. Conversely, by gradually reducing the current intensities used to close the first valves 28b, 29b, a gradual opening as the throttling decreases can be attained. This has the advantage, known in conjunction with progessive multiposition valves, that a column of fluid located in the master brake lines 21 and 24 and the wheel cylinder lines 22 and 25 can be accelerated and decelerated essentially without jerking and thus with low noise. By varying the excitation of the electromagnets 41b, and 42b, it is possible even during an anti-lock operation to adjust the rates of brake pressure change to favorable values, without replacing the throttles 40, 40a shown in FIG. 2.

Another provision for the sake of noise abatement is to further embody the control unit 16b in such a way that it can reduce the rpm of the drive motor 34 of the return pumps 32 and 33, if relatively low rates of brake pressure change suffice in the anti-lock mode.

Figure 4:
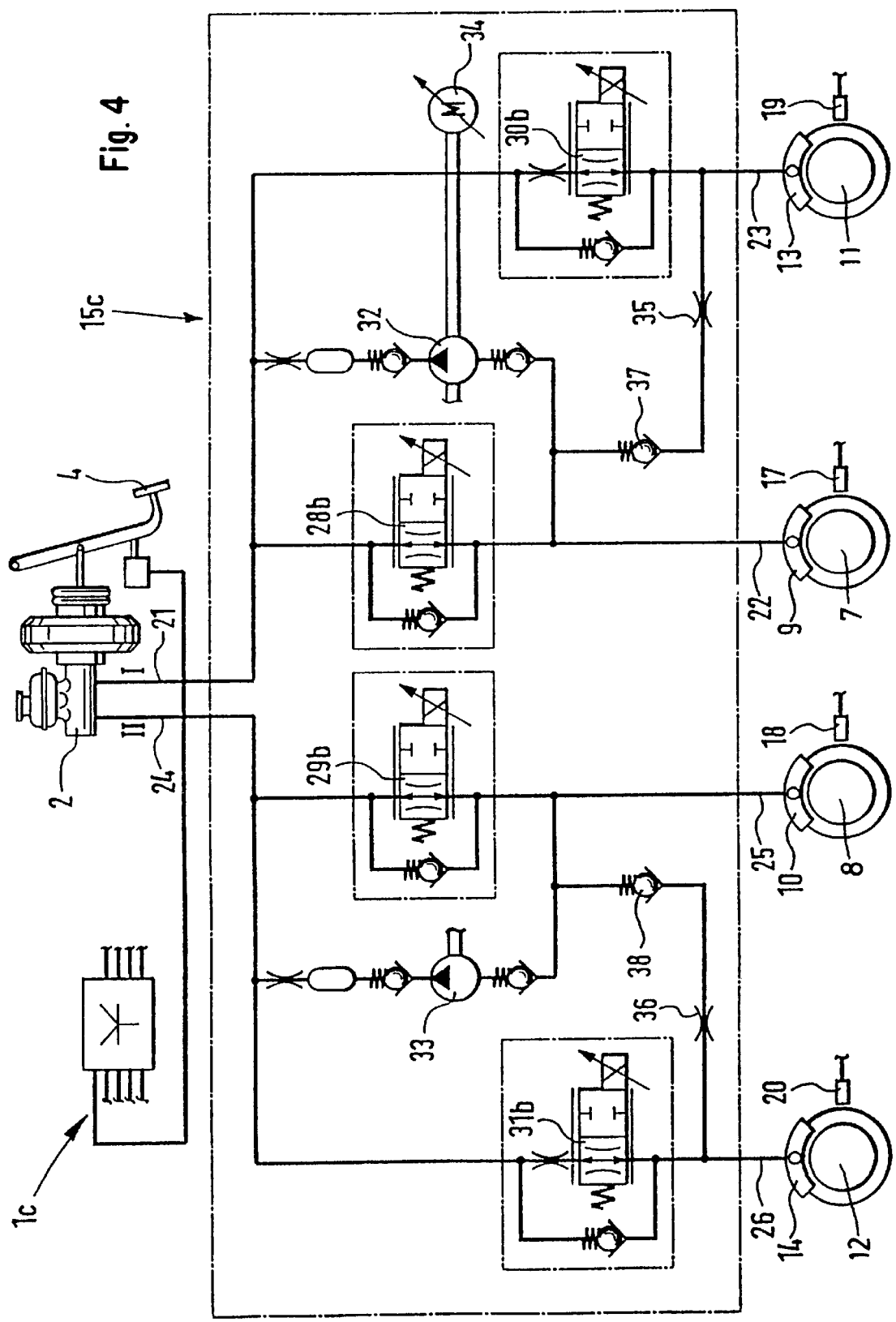
FIG. 4 shows a further circuit diagram of the vehicle brake system with first and second valves in the form of progressive multiposition valves.

The vehicle brake system 1c according to the invention shown in FIG. 4 differs from the vehicle brake system 1b of FIG. 3 in that instead of simply embodied second valves 30 and 31 of FIG. 3, progressive multiposition valves 30b and 31b are now incorporated between the master brake lines 21 and 24 and the wheel brake lines 23 and 26, respectively; these valves may be identical in design and size to the first progressive valves 28b and 29b. As a result, the advantage described can also be achieved between the master cylinder 2 and the wheel brake cylinders 13 and 14.

Figure 5:
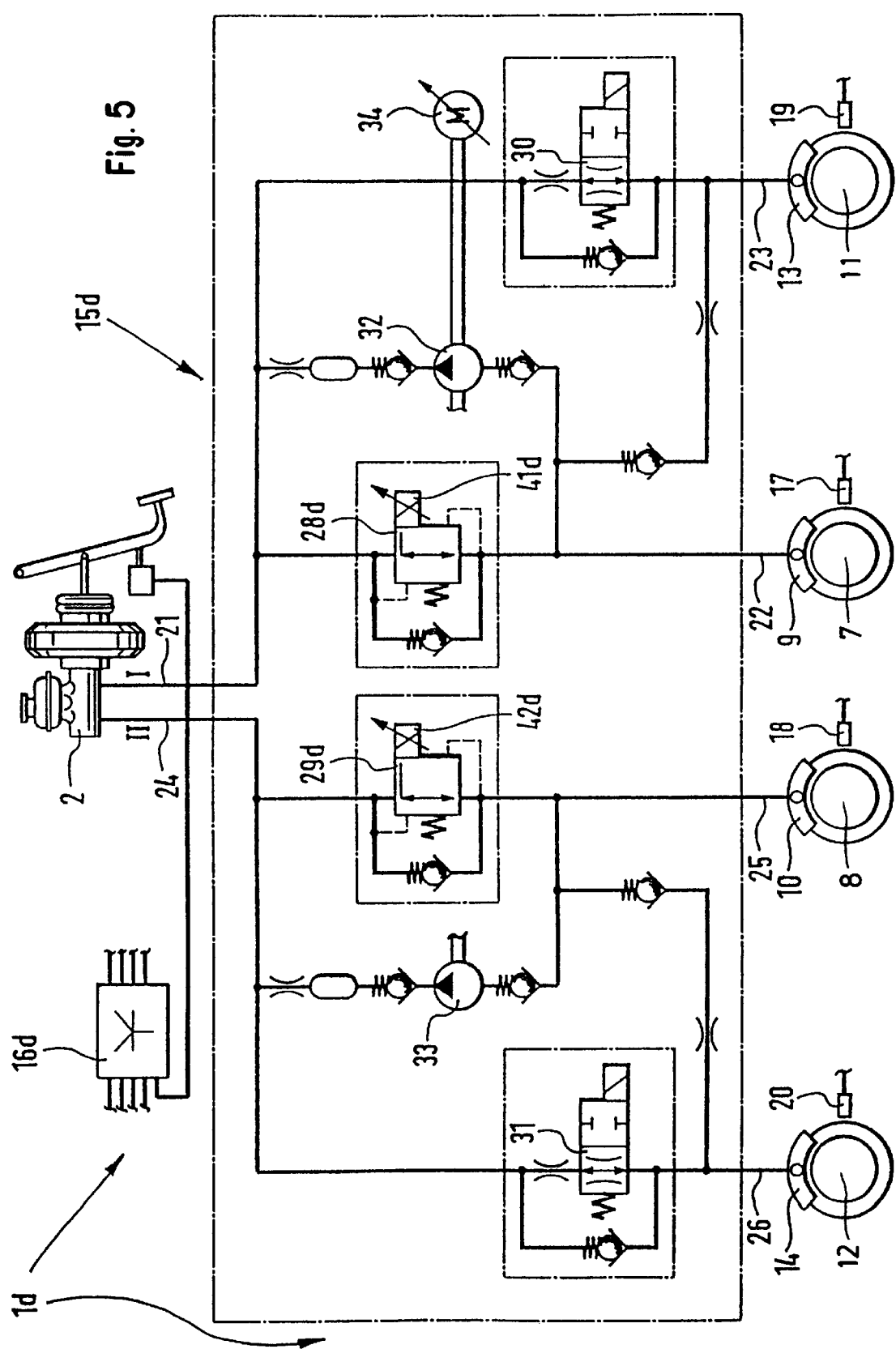
FIG. 5 shows a further circuit diagram of the vehicle brake system with first valves in the form of electrically controllable differential pressure valves.

The vehicle brake system 1d according to the invention shown in FIG. 5 differs from the vehicle brake system 1 of FIG. 1 in that first valves 28d and 29d are embodied as differential pressure valves, through which a flow is possible in two directions, for instance, in their basic positions and in which pressure differences between the master brake lines 21 and 24 and the wheel brake lines 22 and 25 can be adjusted by means of electromagnets 41d and 42d; to symbolize the variably adjustable magnetic force, arrows are shown above the electromagnets 41d and 42d. The stronger the adjusted magnetic force, the greater the pressure difference between the master cylinder 2 and the wheel brake cylinders 9 and 10. By suitable embodiment of the control unit 16d, this unit can adjust brake slip of front wheels to suitably favorable magnitudes via the valves 28d, 29d while the return pumps 32 and 33 are running. Once again, it is possible to embody a change in the excitation of the electromagnets 41d and 42d, which may become necessary, in such a way that abrupt changes in flow are largely avoidable. As in the exemplary embodiment of FIG. 3, the control unit 16d may be embodied such that it sets the rpm of the drive motor 34 only insignificantly above the rpm that is conditionally instantaneously necessary in the anti-lock mode in order to vary brake pressure.

The vehicle brake system 1e of FIG. 6 differs from the vehicle brake system 1d of FIG. 5 in that now the second valves 30d and 31d are also embodied as differential pressure valves. For instance, the second valves 30d, 31d are the same design and size as the first valves 28d and 29d, which have been adopted from FIG. 5. Thus, advantages resulting from the first valves 28d and 29d in the anti-lock mode are also attained upon changes of brake pressure in the wheel brake lines 23 and 26 or in the wheel brake cylinders 13 and 14 connected to them.

It is accordingly apparent that the principle according to the invention of incorporating an electrically controllable valve between the master cylinder and the wheel brake cylinder of a rear wheel brake and connecting the wheel brake cylinder of this rear wheel brake to an inlet check valve of a return pump via a throttle in the respective brake circuit can be achieved with quite variously embodied electrically controllable valves.

The hydraulic vehicle brake system 1f of the circuit diagram of FIG. 9 is based on the hydraulic vehicle brake system 1 of FIG. 1 and therefore for the anti-lock mode, inside a valve receiving block 27f has first valves 28f and 29f and second valves 30, 31, return pumps 32, 33, throttles 35, 36, check valves 37f, 38f, and further check valves 39. To perform traction control, per brake circuit I and II, a third electrically controllable valve assembly 52 and 53, respectively, are incorporated between the master cylinder 2 and the respective first valve 28f and 29f, as well as between the outlet 50 of the respective return pump 32 and 33 and the master cylinder 2 are additionally incorporated into the valve receiving block 27f. Thus each return pump 32, 33 can pump pressure fluid both toward the respective first valve 28f and 29f and the respective third valve assembly 52 and 53. Each third valve assembly 52 and 53 acts on the one hand as a 2/2-way valve, which is urged by a spring 52a and 53a into the basic position shown, which is an open position.

The third valve assemblies are each equipped with an electromagnet 54, by means of which the respective third valve assembly can be switched over to a pressure limiting function. To that end, the symbol for a differential pressure valve 55 is drawn in a second square of each of the symbols for the third electrically controllable valve assemblies 52 and 53. A differential pressure spring 56 is also incorporated into the symbol; this spring determines a pressure drop from the outlet of a respective return pump 50 to the master cylinder 2. This pressure drop is selected to be of the magnitude required as the maximum brake pressure for the traction control mode described below. A third valve assembly functioning in this way can be found in the prior art, such as International Patent Disclosure WO 94/08831. The valve assembly described in this reference has a lip seal, which together with a valve housing block not shown forms a check valve, on an insertable housing part that changes into a necklike part. The third valve assemblies 52, 53 of FIG. 9 can also each be associated with this kind of check valve, which is represented here by the symbol of a spring-loaded check valve 57 and forms a bypass, which can be opened by means of pressure from the master cylinder 2, around the third valve assembly 52. According to this reference WO 94/08831, each third valve assembly 52, 53 and the respective associated check valve 57 form an integral structural unit. In a departure from this construction, it is naturally also possible for each check valve 57 to be built in separately, and instead of an integral arrangement of a multiposition valve having the property of a brake pressure limiting valve, to incorporate a separate 2/2-way valve and a separate differential pressure valve in what would then be a modified valve receiving block.

For the traction control mode mentioned above, fourth valve assemblies 60, 61 are additionally incorporated into the housing block 27f. In FIG. 9, each fourth valve assembly includes a first 2/2-way valve 62 and a second 2/2-way valve 63. The first 2/2-way valve 62 has an opening spring 64 and an electromagnet 65 for closing and is accordingly a 2/2-way valve 62 that is normally open. The first 2/2-way valve 62 has an inlet 66, which communicates with the respective wheel brake cylinder 9 and 10 of a front wheel brake 7 and 8 and the respective check valve 37f and 38f. The first 2/2-way valve 62 also has an outlet 67, to which an inlet 49 of a respective return pump 32 and 33 is connected.

The second 2/2-way valve 63 has a closing spring 68 and an electromagnet 69 for overcoming the closing force of the closing spring 68. An inlet 70 of the second 2/2-way valve 63 is connected to the master cylinder 2, and an outlet 71 of this second 2/2-way valve 63 communicates with the inlet 49 of the respective return pump 32 or 33.

A control unit 16f differs from the control unit 16 of FIG. 1 in that it is arranged not only to detect the threat of wheel locking on braking by actuation of the brake pedal 4 but also to detect excessive drive slip or even the danger of spinning of drivable front wheels that are associated with the front wheel brakes 7 and 8. To that end, the control unit 16f compares signal trains, for instance output by the wheel rotation sensors 17, 18, with signal trains from wheel rotation sensors 19, 20 assigned to nondriven rear wheels. Accordingly, the device 15f accommodated inside the valve receiving block 27f is a wheel slip control device to avoid excessive wheel slip when braking is done by brake pedal actuation or when front wheels are being driven.

Wheel slip control to avoid the threat of wheel locking in braking by actuation of the brake pedal 4 is performed in a manner described for the vehicle brake system 1 of FIG. 1. In the process, the third valve assemblies 52, 53 and the fourth valve assemblies 60, 61 remain in the positions shown and described.

Let it be assumed that a drive slip at the front wheel associated with the front wheel brake 7 is becoming greater and greater; then the control unit 16f turns on the drive motor 34 for the return pumps 32, 33, turns on the electromagnet 54 of the third valve assembly 52 so that this valve assembly is closed, moves the second 2/2-way valve 63 of the third valve assembly 60 into the open position, and moves the second valve 30 and the first 2/2-way valve 62 of the fourth valve assembly 60 into the closing position. As a consequence, the return pump 32, embodied for this purpose as self-aspirating, draws its supply of pressure fluid from the fluid container 3 through the second 2/2-way valve 63 of the fourth valve assembly 60 and through the master brake line 21 and the master cylinder 2 and forces this pressure fluid through the open first valve 28f to the wheel brake cylinder 9 of the front wheel brake 7. In this process the third valve assembly 52 prevents the outflow of pressure fluid to the master cylinder 2 and the fluid container 3. As a consequence, brake pressure is created in the wheel brake cylinder 9, and this pressure rises all the more, the longer the return pump 32 feeds pressure fluid. The effect of rising brake pressure in the wheel brake cylinder 9 is that the associated driven wheel is increasingly braked, and a braking moment acting on the braked driven wheel begins to compensate for an excess drive moment. Upon overcompensation, the rpm of the front wheel slows down relative to the rpm of a vehicle wheel that is rotating freely, for instance, so that the wheel slip becomes less.

If the control unit 16f ascertains that the wheel slip has shrunk to an allowable magnitude, for instance, then the first valve 28 is closed, with the consequence that brake pressure in the wheel brake cylinder 9 becomes no greater. Since from the time the first valve 28f closes the return pump 32 furnishes pressure fluid to excess, the third valve assembly opens, overcoming the force of the pressure difference spring 56 when a pressure difference between the outlet 50 of the return pump 32 and the master cylinder 2 at the level of the projected highest pressure for the traction control mode is reached, so that pressure fluid supplied to excess flows to the master cylinder 2 and from there is again available through the second multiposition valve 63 of the fourth valve assembly 60 at the inlet 90 of the return pump 32. Since in the traction control mode the brake pedal 4 is normally not actuated, the master cylinder 2 is normally pressureless, so that the pressure difference valve 55 of the third valve assembly 52 acts as a safety valve.

The effect of the "safety valve" function is that in the pressure difference valve 55 power is converted into energy loss. This is avoidable if the control unit 16f is arranged such that in the traction control mode, from the time the first valve 28f flows, the electromagnet 54 of the third valve assembly 52 is rendered currentless, so that the spring 52a opens the third valve assembly 52, and as a result, the return pump 32 pumps pressure fluid without substantial pressure generation, or in other words functions essentially as if it were idling.

Once drive slip has become sufficiently less, for instance because the driven front wheel reaches a zone of the roadway that has a higher coefficient of friction, then less brake pressure or even no brake pressure is needed in the wheel brake cylinder 9 of the front wheel brake 7. As a consequence, the wheel brake pressure should be lowered, which can be accomplished in the simplest way by the described opening of the third valve assembly 52 and additionally opening the first valve 28f. In any event, this works whenever the brake pedal 4 is not actuated.

If the brake pedal 4 is actuated, which the control unit 16f recognizes for instance from a signal from a pedal position switch or brake light switch 80, then it will keep the first valve 28f closed or move it into the closing position, return the second multiposition valve 63 of the fourth valve assembly 60 to the closing position, and keep the first multiposition valve 62 of the fourth valve assembly 60 open, so that the return pump 32 receive and pumps it back, counter to a pressure prevailing in the master cylinder 2, through the master cylinder 2 to the fluid container 3. As soon as the front wheel drive slip has dropped sufficiently as a result, the control unit can cause the first 2/2-way valve 62 of the fourth valve assembly 60 to return to the closing position and essentially simultaneously can cause the first valve 28f to return to the opening position, so that a driver, by actuating the brake pedal 4, can intentionally generate brake pressure in the front wheel brake cylinder 9. Since at the same time the rear wheel brake 11 is meant to come into action, the control unit 16f will also cause the second halve 30 to return to its open position. Accordingly, the portion of the vehicle brake system if that is associated with brake circuit I and is connected to the master brake line 21 is unrestrictedly available for intentionally slowing down the vehicle.

The described type of wheel slip control for disadvantageously increasing drive slip of a front wheel associated with the front wheel brake 7 can also be performed analogously for a drivable front wheel that is associated with the front wheel brake 8 of brake circuit II, which is connected to the master brake line 24. Accordingly, the control unit 16f is arranged to control valves in the same way in brake circuit II as has been described for valves in brake circuit I. Depending on the prevailing drive slip conditions, the control unit 16f may also simultaneously supply brake pressure to reduce drive slip to the wheel brake cylinders 9 and 10 of both front wheel brakes 7 and 8.

The circuit diagram of FIG. 9 has differences compared with the circuit diagram of FIG. 1. For instance, the symbols for springs that are found in FIG. 1 are missing from the check valves 37f and 38f of FIG. 9. Unlike a throttle 40 that is disposed separately and hence in series with the first valve 28, here both the first valve 28f and the other first valve 29f are embodied so as to act themselves as a throttle 40f, which can be attained for instance by adjusting the width of a valve gap when the valve 28f is open. To that end, means that limit armature strokes, which are not shown, are adjusted in a manner known per se. On the other, it is naturally also possible as in FIG. 1 to dispose throttles 40 in series with the first valves. In that case, these first valves would again carry reference numeral "28" as in FIG. 1.

Omitting the springs from the check valves 37f and 38f makes it possible, when the second valves 30 and 31 are closed, to allow wheel brake pressures in the wheel brake cylinders 13 and 14 of the rear wheel brakes 11 and 12 to drop to the wheel brake pressures that prevail in the wheel brake cylinders 9 and 10 of the front wheel brakes 7 and 8. It can be seen from this that if disadvantageously the first valve 28f or 29f is closed, for instance, because the check valves 39 are parallel, when the brake pedal 4 is released quantities of pressure fluid flow through the check valves 39, so that wheel brake pressures vanish in the intended way.

FIGS. 3, 4, 5 and 6 disclose the fact that first and second valves 28, 29, 30 and 31 of the 2/2-way valve type, shown in FIG. 1, can be replaced for instance by progressively adjustable multiposition valves or progressively adjustable differential pressure valves. Accordingly, the valve assemblies 52, 53, 60, 61 used for traction control are not limited to the combination with the valve assemblies of FIG. 9 used for anti-lock purposes; on the contrary, the valve assemblies 52, 53, 60 and 61 can also be combined with the vehicle brake systems of FIGS. 3–6.

A further exemplary embodiment of a vehicle brake system 1g serving to control wheel brake slip in braking by brake pedal actuation and also to compensate for excess drive torque at driven wheels is shown in FIG. 9. In this vehicle brake system 1g, the point of departure was again the vehicle brake system 1 of FIG. 1; here, third valve assemblies are identical with the third valve assemblies 52 and 53 already described in conjunction with FIG. 9. However, fourth valve assemblies 60g and 61g differ from the fourth valve assemblies 60 and 61 of FIG. 9 in that no electromagnets are needed to control the fourth valve assemblies 60g and 61g. The fourth valve assemblies are therefore embodied as 3/2-way valves 73, which each have one spring 74 determining a basic position and one control inlet 75. One control conduit 76 each, which leads to the respective control inlet 75, communicates through a valve receiving block 27g and the master brake line 21 and 24 with the master cylinder 2. Actuating the brake pedal 4, causing pressure fluid to emerge from the master cylinder 2, has the effect through the master brake line 21 and the control conduit 76 as well as the control inlet 75 that the spring 74 is compressed.

Figure 10:
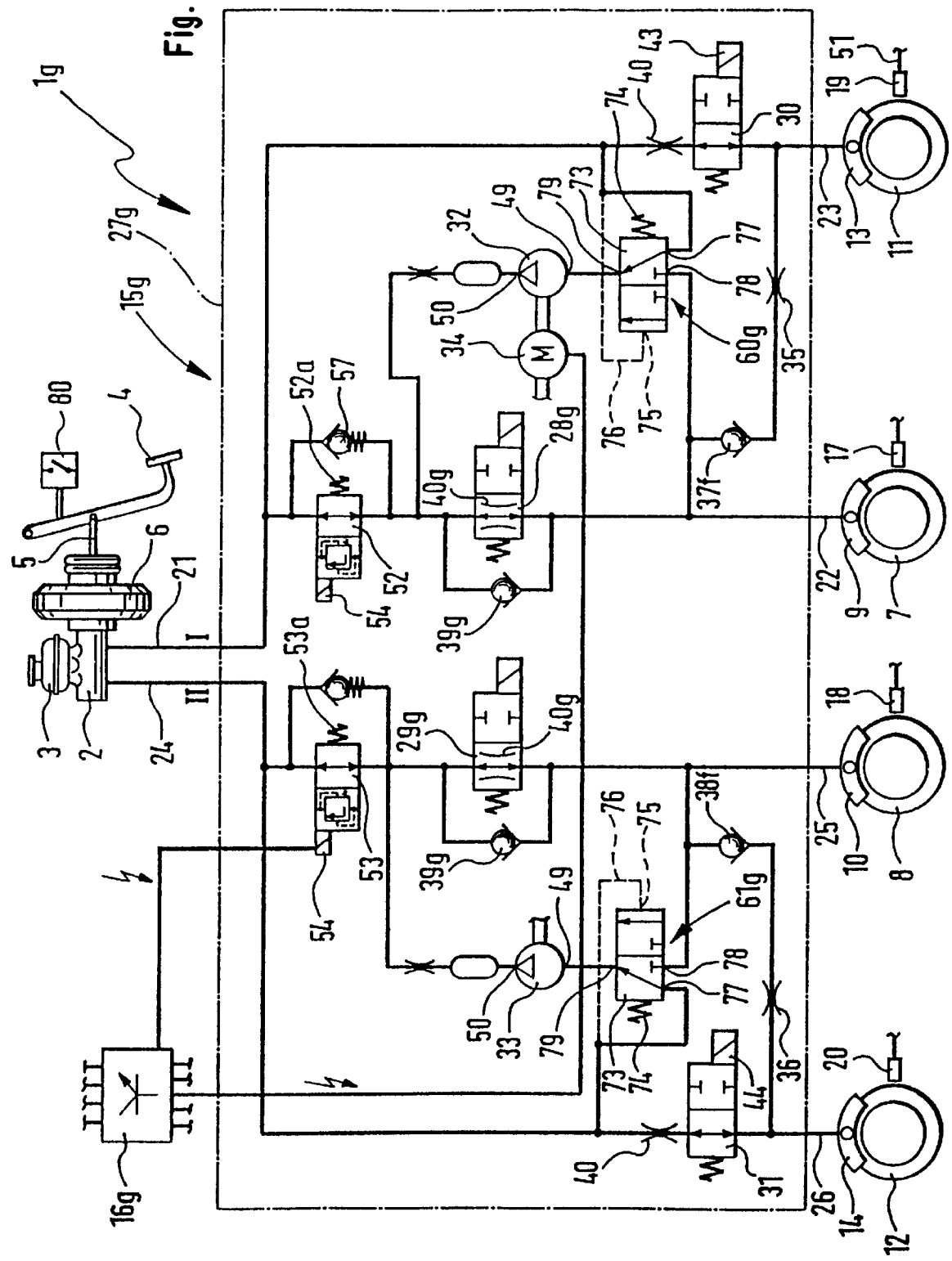
FIG. 10 shows a second further embodiment, again for traction control.

Each fourth valve assembly 60g, 61g has a first connection 77, a second connection 78, and a third connection 79. Along with the aforementioned compression of the respective spring 79 effected by supplying pressure fluid to the control inlet 75, this has the effect that the fourth valve assembly 60g or 61g of FIG. 10 is a so-called 3/2-way valve. The first connection 77 of each of the four valve assemblies 60g and 61g communicates hydraulically permanently with the master cylinder 2 through the respective master brake line 21 and 24. The second connection 78 communicates permanently with a respective wheel brake cylinder 9 and 10 of a front wheel brake 7 and 8. The third connection 79 can be called a valve outlet and communicates with the inlet 49 of the respective return pump 32 and 33. In FIG. 10, when the brake pedal 4 is not actuated, a hydraulic communication thus exists from the fluid tank 3 to the respective return pump 32 and 33, through the master cylinder 2, the respective master brake line 21 and 24 and the respective first connection 77 and third connection 79, so that once the drive motor 34 is turned on this return pump can supply itself with pressure fluid from the fluid tank 3. Conversely, if control pressure is fed into the respective control inlet 75 by actuation of the brake pedal 4, then as already noted the respective fourth valve assembly 60g and 61g switches over to the switching position, as a result of which the respective first connection 77 as well as the fluid tank 3 are disconnected from the respective return pump 32 and 33, and instead the respective wheel brake cylinder 9 and 10 communicates with the return pump 32 and 33 via the respective second connection 78.

A control unit 16g belonging to the vehicle brake system ig differs from the control unit 16f of the exemplary embodiment of FIG. 9 in that now the control unit 16g needs to control merely the third valve assemblies 52 and 53 adopted from the exemplary embodiment of FIG. 9. This makes the arrangement less expensive in terms of electronics and electrical components, compared with the exemplary embodiment of FIG. 9.

When the brake pedal 4 is actuated for the sake of braking, then in the manner already described the respective fourth valve assembly 60g and 61g is hydraulically controlled into the switching position, and the consequence is that the inlets 49 of the return pumps 32 and 33 communicate with the associated wheel brake cylinders 9 and 10, so that when the brake pedal 4 is actuated forcefully, thus creating the threat of wheel locking, the return pumps 32 and 33 are capable of returning excess pressure fluid contained in the wheel brake cylinders 9 and 10, to the master cylinder 2 for the sake of lowering the brake pressure. To that end, in the manner already described, the drive motor 34 is turned on and at least one first valve 28g or 29g is controlled into the blocking position, depending on which of the front wheels associated with the front wheel brakes 7 and 8 is experiencing an incipient threat of locking. The third valve assemblies 52 and 53 are in their basic positions at that time, which as already noted are determined by springs 52a and 53a. If there is a threat of wheel locking at at least one of the rear wheels with which the rear wheel brakes 11 and 12 are associated, then as described for the first exemplary embodiment of FIG. 1 at least one second valve 30 or 31, depending on set conditions, is controlled into the closing position, as a result of which the inflow of pressure fluid through the aforementioned valves into the wheel brake cylinders 13 and 14 of the rear wheel brakes 11 and 12 can be prevented, and accordingly the return pump 32 and 33 can receive pressure fluid from the affected wheel brake cylinders 13 and 14 through the respectively associated throttle 35 and 36 and the check valves 37f and 38f and force it back to the master cylinder 2, until the threat of locking at the respective rear wheel vanishes.

Traction control generally occurs when the brake pedal 4 is not actuated, because a driver is controlling the drive moment for drivable front wheels by means of an accelerator pedal, not shown. As a consequence, each fourth valve assembly 60g and 61g is in the basic position illustrated.

If drive slip should now increase excessively at a driven front wheel belonging to the front wheel brake 7, for instance, then the control unit 16g recognizes this danger from trains of signals from the associated wheel rotation sensor 17. Consequently, the control unit 16g will turn on the drive motor 34 of the return pumps 32 and 33 and, as in the exemplary embodiment of FIG. 9, will control the third valve assemblies 52 and 53, so that they act as the required pressure difference valves to limit a maximum pressure drop between the outlets 50 of the return pumps 32 and 33 and the master brake lines 21 and 24. While the first valve 28g is still open, the return pump 32 will pump pressure fluid, drawn from the master brake line 21 and the fluid tank 3, into the wheel brake cylinder 9, thus creating wheel brake pressure and wheel brake moment which at least compensates for an excess in drive moment at the front wheel that led to the tripping of the traction control mode. The drive slip is thereby reduced. Once the drive slip has been reduced sufficiently, the first valve 28g can for instance be closed, so that no further brake pressure rise then occurs in the wheel brake cylinder 9. If the control unit 16g detects a drop in drive slip below a critical threshold, then it can allow the third valve assembly 52 to return to the basic position shown, with the consequence that pressure fluid flows from the wheel brake cylinder 9 through the check valve 39g, through the third valve assembly 52 and the master brake line 21, and through the master cylinder 2, back into the fluid tank 3. By way of example, this can happen while the first valve 28g is still closed. A complete relief of wheel brake pressure of the wheel brake cylinder 9 is attained by switching the first valve 28g back into the basic position shown.

In addition to the way described above of generating wheel brake pressure in the wheel brake cylinder 9 and keeping the wheel brake pressure constant and lowering it, the possibility also exists, because of the permanent communication between the fluid tank 3 and the inlet 49 to the return pump 32 while the first valve 28g is open and the brake valve 4 is not actuated, of controlling an increase and reductions in the wheel brake cylinder 9 by controlling the third valve assembly 52 back and forth between the basic position shown and the position that results in the function of a differential pressure control valve. Then, with the third valve assembly controlled into its second position, brake pressure increases are generated in the wheel brake cylinder by the return pump 32, and whenever the control unit 16g has detected an adequate compensation for excess drive moment, the third valve assembly 52 is allowed to return to the basic position, which is determined by the spring 52a. In this method of controlling the third valve assembly 52 for the sake of traction control, brake pressure increases and brake pressure reductions succeed one another with a sawtooth course of brake pressure. This kind of sawtooth course of brake pressures is typical for a so-called two-point controller, which is relatively easily made.

The traction control mode described, merely by turning on the drive motor 34 of the return pump 32 and by controlling the third valve assembly 52 back and fourth by means of the spring 52a or the electromagnet 54 adopted from the example of FIG. 9 offers the advantage that the return pump 32 needs to generate merely the pressure required to compensate for excess drive moment. Such a wheel brake pressure can be substantially lower than the pressure difference that the third valve assembly 52, when the electromagnet 54 is turned on and the brake pedal 4 is not actuated, generates relative to the pressure in the master cylinder 2. It will be appreciated that in such a favorable case less energy is consumed to drive the return pump 32, and moreover less noise is generated.

It will be readily understood that an excess drive moment of an associated front wheel, not shown, to be compensated for by means of the front wheel brake 8 of the brake circuit II can be carried out in the same way as for the drive wheel associated with brake circuit I and the front wheel brake 7. For instance, by coincidence, traction control can occur simultaneously in both brake circuits I and II, or in alternation, or overlapping one another.

The exemplary embodiments of FIGS. 9 and 10 show that for fourth valve assemblies, two different paths for pressure fluid to the inlets 49 of the return pump 32 and 33 are to be selected by switching. This is attained in the example of FIG. 9 by furnishing two closable valve seats, distributed in a manner not shown to the two 2/2-way valves 62, 63, per brake circuit or for each of the return pumps 32 and 33. In the exemplary embodiment of FIG. 10, the fourth valve assembly 60g and 61g has three connections 77, 78 and 79; in the embodiment as seat valve assemblies according to the prior art, a valve seat not shown belongs to the first connection 77 and a second valve seat not shown belongs to the second connection 78. It can be seen from this that selectively, multiposition valves of the 3/2-way valve type or combinations of two 2/2-way valves each can be used for the fourth valve assemblies 60g and 61g. It can also be seen that the fourth valve assemblies can be embodied as either hydraulically or electromagnetically controllable. To one skilled in the art of wheel slip control systems, it is then clear that to perform the task of the fourth valve assemblies, one can control 2/2-way valves hydraulically or can control one 3/2-way valve electromagnetically. Accordingly, the further embodiment of anti-lock systems in accordance with FIGS. 1, 3, 4, 5 and 6 is not limited to the particular third and fourth valve assemblies shown in FIGS. 9 and 10.

In FIGS. 9 and 10, unlike FIG. 1, the check valve 37f and 38f are shown without springs. The check valves 37f and 38f are therefore embodied as seat valves, for instance, with valve balls that are capable of closing the valve seats by their own weight, for instance. Since such valve balls inside vehicle brake systems are known to be very small and therefore light in weight, the valve seats can also be built in above the balls, so that a pressure drop, for instance from the front wheel brake cylinder 9 to the rear wheel brake cylinder 13, causes a flow that lifts the valve ball into the valve seat. In this way it is then possible for the traction control mode as well to keep a front wheel brake pressure, which is operative in the front wheel brake cylinder 9 to compensate for excess drive moment, maximally far away from the rear wheel brake cylinder 13.

Unlike the spring-equipped check valves 39 shown in FIGS. 1–6 and 9, in FIG. 10 check valves 39g without springs are shown. Valve seats of the check valves 39g will preferably be disposed below the closing bodies, which are embodied for instance as balls. Since the springless check valves 39g can be opened by means of a lesser pressure drop, the brake pressures in the wheel brake cylinders 9, 10 when the first valves 28g, 29g are closed can drop farther than in the exemplary embodiments described earlier herein. This is advantageous when driving over ice and snow and can speed up the reduction in brake pressure. Naturally, this advantage can also be adopted for the exemplary embodiments of FIGS. 1–6 and 9.

The foregoing relates to preferred exemplary embodiments of the invention, it being understood that other variants and embodiments thereof are possible within the spirit and scope of the invention, the latter being defined by the appended claims.

We claim:

1. A hydraulic brake system for a vehicle comprising a dual-circuit master cylinder, two brake circuits (I, II) in diagonal configuration for two front wheel brakes (7, 8) and two rear wheel brakes (11, 12), an anti-lock system built into the brake circuits in which each brake circuit has one return pump (32, 33) with an inlet and an outlet and one first (28, 29) and one second (30, 31) electrically controllable valve that are normally open, the first valve being disposed between the master cylinder and a respective front wheel brake and the second valve communicating with a respective rear wheel brake, the second valves (30, 31; 30b, 31b; 30d, 31d) are disposed between the rear wheel brakes (11, 12) and the master cylinder (2), and that the rear wheel brakes (11, 12) communicate via throttles (35, 36) with the inlet to each of the return pumps (32, 33), and via check valves (37, 38) that open in a direction of the inlet of a respective return pump (32, 33), said check valves (37, 38) are placed in series with each throttle (35, 36), and a second check valve (49) in the input line to the pump (32, 33), said hydraulic brake system having a control unit (16), which in normal braking operation is used to close at least one of said second valves (30, 31; 30b, 31b; 30d, 31d) as soon as a preselected brake slip magnitude is reached by a respective rear wheel.

2. A hydraulic brake system in accordance with claim 1, in which at least one of the valves (28, 29, 30, 31) is embodied as a 2/2-way valve.

3. A hydraulic brake system in accordance with claim 2, in which one further throttle (40) is connected in series with the 2/2-way valve (28, 29, 30, 31).

4. A hydraulic brake system in accordance with claim 1, in which at least one of the valves is embodied as a progressive multiposition valve (28b, 29b, 30b, 31b).

5. A hydraulic brake system in accordance with claim 1, in which at least the valves located between the master cylinder (2) and the front wheel brakes (9, 10) are embodied as 3/2-way valves (28a, 29a).

6. A hydraulic brake system in accordance with claim 1, in which at least two of the valves are embodied as differential pressure valves (28d, 29d, 30d, 31d), whose electromagnets (41d, 42d) can be acted upon with a variable exciter current.

7. A hydraulic brake system in accordance with claim 1, in which a control unit of an anti-lock arrangement (2, 2a, 2b, 2c, 2d, 2e) is arranged for controlling a pumping capacity of the return pumps (32, 33).

8. A hydraulic brake system in accordance with claim 1, in which bypasses (45, 46) with check valves (39) that open toward the master cylinder (2) are connected parallel to one of said first or second valves (28, 29, 28b, 29b, 28d, 29d).

9. A hydraulic brake system in accordance with claim 1, in which for traction control of drive wheels associated with the front wheel brakes (9, 10), a third electric ally controllable valve assembly (52, 53) is connected between the master cylinder (2) and the respective first electrically controllable valve (28, 29; 28b, 29b; 28d, 29d; 28f, 29f; 28g, 29g) and between the master cylinder (2) and a respective outlet of the respective return pump (32, 33), said third electrically controllable valve is normally open and in a traction control mode is at least conditionally closed; that a fourth valve assembly (60, 61; 60g, 61g) is connected between the master cylinder (2) and an inlet of each return pump (32, 33) and between a front wheel brake (7, 8) and the respective inlet of each return pump (32, 33), for connecting the respective front wheel brake (7, 8) to the respective inlet of the respective return pump (32, 33) in a braking mode effected by means of the brake pedal (4) and for connecting the master cylinder (2), combined with a fluid tank (3), to the respective inlet of the respective return pump (32, 33) while simultaneously disconnecting the respective front wheel brake (7, 8) from the respective inlet of the respective return pump (32, 33).

10. A hydraulic brake system in accordance with claim 9, in which the fourth valve assembly (60, 61) includes a normally closed electrically controllable 2/2-way valve (63) between the master cylinder (2) and the inlet of the respective return pump and a normally open electrically controllable 2/2-way valve (62) between the respective front wheel brake (7, 8) and the inlet of the respective return pump (32, 33).

11. A hydraulic brake system in accordance with claim 9, in which the fourth valve assembly (60g, 61g) is embodied as a hydraulically controllable 3/2-way valve (60g, 61g, 75, 77, 78, 79, 74), which in a basic position determined by a spring (74), connects the master cylinder (2) to the inlet of the respective return pump (32, 33) and at the same time disconnects the respective front wheel brake (7, 8) from the inlet of the respective return pump and has a control inlet (75) which is connected to the master cylinder (2) in such a way that upon actuation of the brake pedal (4), and attendant pressure originating in the master cylinder (2), the respective front wheel brake (7, 8) is connected to the associated inlet of the associated return pump (32).

12. A hydraulic brake system in accordance with claim 9, in which the third valve assembly (52, 53) is embodied as a seat valve and has a pressure difference spring (56) between a valve seat closing member and an electromagnet (54).

13. A hydraulic brake system in accordance with claim 9, in which whichever check valve is located between a wheel brake cylinder (13, 14) of a rear wheel brake (11, 12) and the associated first valve (28f, 29f; 28g, 29g) and is openable toward the respective first valve (28f, 29f; 28g, 29g) is embodied as a springless check valve (37f, 38f).

\* \* \* \* \*